United States Patent
Löhner et al.

(10) Patent No.: US 6,542,110 B1
(45) Date of Patent: Apr. 1, 2003

(54) DEVICE AND METHOD FOR INCREASING THE ANGULAR RESOLUTION OF AN ANTENNA ARRANGEMENT

(75) Inventors: Andreas Löhner, Ulm (DE); Wolfgang Rieck, Eching (DE)

(73) Assignee: Eads Deutschland GmbH, Munich (DE)

( * ) Notice: Subject to any disclaimer, the term of this patent is extended or adjusted under 35 U.S.C. 154(b) by 0 days.

(21) Appl. No.: 09/763,069

(22) PCT Filed: Jun. 10, 2000

(86) PCT No.: PCT/DE00/01879

§ 371 (c)(1),
(2), (4) Date: Apr. 5, 2001

(87) PCT Pub. No.: WO00/77544

PCT Pub. Date: Dec. 21, 2000

(30) Foreign Application Priority Data

Jun. 16, 1999 (DE) .......................... 199 27 395

(51) Int. Cl.$^7$ .............................. G01S 13/90
(52) U.S. Cl. ...................... 342/25; 342/73; 342/74; 342/81; 342/157; 342/159; 342/195
(58) Field of Search .............................. 342/25, 26, 33, 342/34, 35, 73, 74, 78, 81, 147, 158, 368–377, 159–164, 175, 192, 193–197, 89–103, 148–157

(56) References Cited

U.S. PATENT DOCUMENTS 4,727,373 A * 2/1988 Hoover .................. 342/25

5,323,162 A 6/1994 Fujisaka et al.

FOREIGN PATENT DOCUMENTS

| DE | 3620734 | 12/1987 |
| DE | 3712065 C1 | 9/1988 |
| EP | 0434064 | 6/1991 |

OTHER PUBLICATIONS

Lohner, A.K. "Improved Azimuthal Resolution of Forward Looking SAR by Sophisticated Antenna Illumination Function Design" IEE Proc.—Radar, Sonar and Navigation vol. 145, No. 2, Apr. 1998.
Lohner, A. et al. "Enhancement of the Angular Resolution of Radar Antennas by Diagram Spreading" 1996 IEEE 4$^{th}$ International Symposium on Spread Spectrum Techniques And Applications Proceedings.

* cited by examiner

Primary Examiner—Bernarr E. Gregory
(74) Attorney, Agent, or Firm—Ladas & Parry

(57) ABSTRACT

The invention describes a device and a method for increasing the angular resolution in a radar system looking in the direction of motion and laterally thereto, wherein the doppler frequency shift of the transmitted signal is evaluated in order to increase the angular resolution. For this purpose, a plurality of adjacent, narrow regions are sampled sequentially by means of pencil-beam antenna characteristics during movement of the antennas. Relative to the total area, this is equivalent to illumination with a broad-beam antenna characteristic. The results from the simulation of this broad-beam illumination are combined with the results of the pencil-beam sampling processes in order to achieve an increase of the angular resolution of the antenna array.

10 Claims, 3 Drawing Sheets

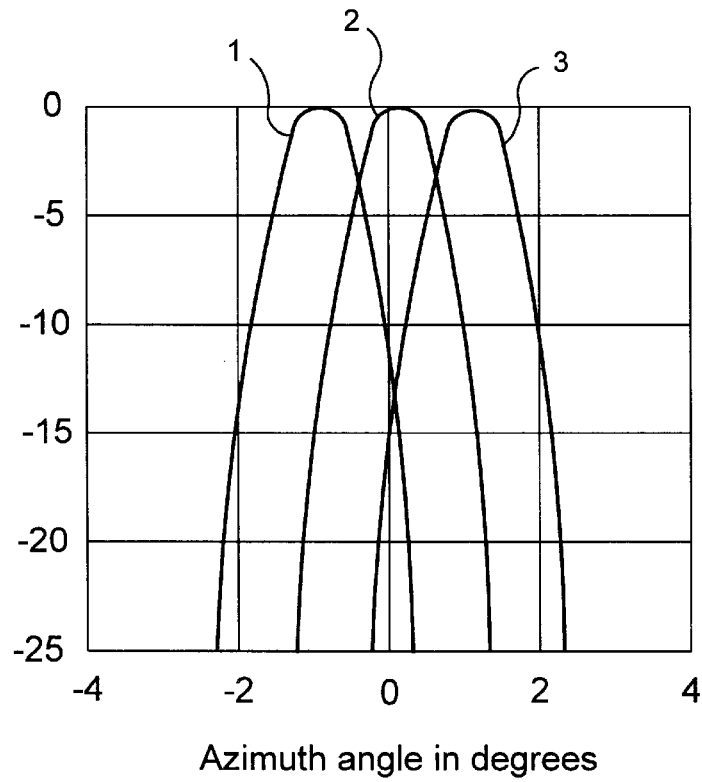
Azimuth angle in degrees
F I G. 2
Azimuth resolution [°]
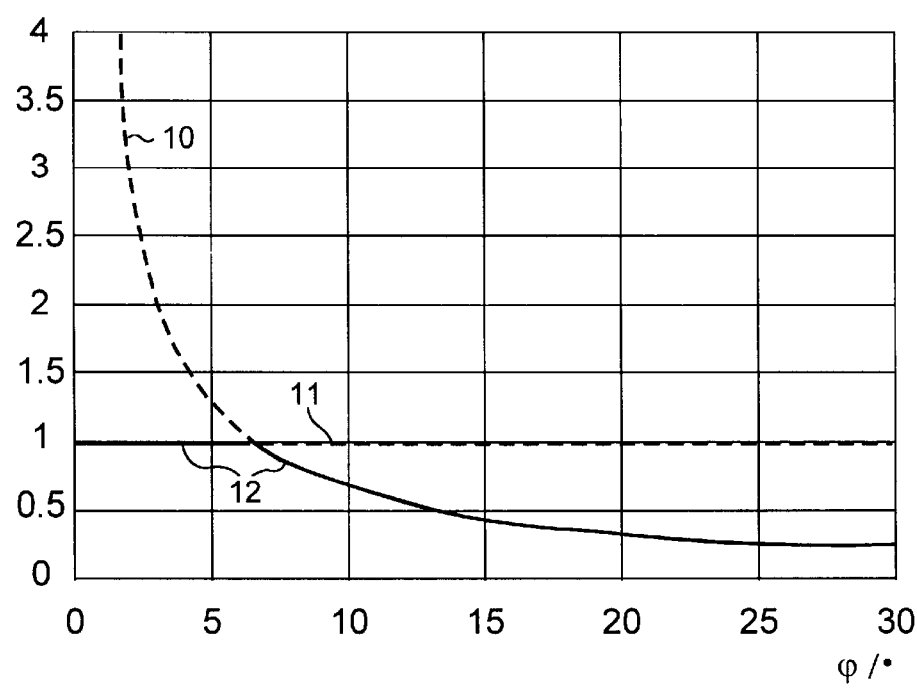
Azimuth viewing direction of the SAR
F I G. 3

DEVICE AND METHOD FOR INCREASING THE ANGULAR RESOLUTION OF AN ANTENNA ARRANGEMENT

BACKGROUND OF THE INVENTION

The invention relates to a device and a method for increasing the angular resolution in a synthetic aperture radar system (SAR) looking in the direction of motion and laterally thereto.

The invention relates to an imaging radar system on board a moving platform. The object of the radar system is the imaging of a terrain lying in the direction of motion and of objects disposed thereon. The moving platform on which the radar system is mounted can be, for example, an aircraft, an unmanned missile, a satellite or a land vehicle. The radar system comprises a device for generating the transmitted signal, a transmitting antenna system, a receiving antenna system and a signal-processing device for evaluating the backscattered signals. The maximum size of the aperture of the transmitting antenna system and of the receiving antenna system is predetermined unchangeably by the space available in the moving platform. The resulting antenna characteristic with which the terrain to be imaged is illuminated is determined by superposition of the antenna characteristics of the transmitting antenna system and of the receiving antenna system.

Knowing the half-value width $2\alpha_{3dB}$ of the resulting antenna characteristic, the theoretical azimuth resolution $\Delta_{RAR}$ for such an imaging radar system is expressed as follows on the basis of the antenna characteristic:

$$\Delta\phi_{RAR} \sim 2\alpha_{3dB} \qquad (1)$$

This resolution $\Delta\phi_{RAR}$ is also known as real aperture radar resolution (J. C. Curlander, R. N. McDonough; Synthetic Aperture Radar, John Wiley & Sons, Inc., New York, 1991). The real aperture radar resolution $\Delta\phi_{RARmax}$ is identical for all azimuth directions. The maximum real aperture radar resolution $\Delta\phi_{RAR}$ is limited by the maximum space available and is expressed by the maximum horizontal aperture width $2\xi_{max}$ normalized to the transmission wavelength and thus the minimum attainable half-value width $2\alpha_{dBmin}$ $$2\alpha_{3dBmin} = \frac{1}{2\xi_{max}} \cdot \frac{180°}{\pi} \qquad (2)$$

$$\Delta\phi_{RARmax} = 2\alpha_{3dBmin} = \frac{1}{2\xi_{max}} \cdot \frac{180°}{\pi} \qquad (3)$$

Since the real aperture radar resolution $\Delta\phi_{RARmax}$ is limited, resolution in the case of forward-looking radar systems also takes place on the basis of the doppler frequencies in azimuth direction. With the transmission frequency $f_c$, the platform velocity v, the velocity of light $c_0$, the half-value width $2\alpha_{3dB}$ and the angular velocity ω of the resulting antenna characteristic, the theoretically possible azimuth resolution is expressed on the basis of the doppler frequencies in the azimuth viewing direction φ (Wehner, R. D.: High-resolution radar, Artech House, Norwood, 1995):

$$\Delta\varphi_{DBS}\bigg| - \frac{c_0 \cdot \omega}{4\alpha_{3db} \cdot v \cdot f_c \cdot si\mu(\varphi)} \cdot \frac{180°}{\pi}, \qquad (4)$$

This resolution $\Delta\phi_{DBS}$ is also known as the doppler beam sharpening resolution. In FIG. 1 there are illustrated, as a function of azimuth viewing direction φ, the resolutions $\Delta\phi_{RAR}$ according to (1) and $\Delta\phi_{DBS}$ according to (4) for the values $f_c$=10 GHz, v=100 m/s, ω=40°/s and $2\alpha_{3dB}$32 1° and 3° respectively used as examples. It is shown that, with decreasing half-value width $2\alpha_{3dB}$, the real aperture radar resolution $\Delta\phi_{RAR}$ becomes better, although at the same time the doppler beam sharpening resolution $\Delta\phi_{DBS}$ deteriorates. From FIG. 1 it can also be inferred that, for large φ, the doppler beam sharpening resolution $\Delta\phi_{DBS}$ is higher than the real aperture radar resolution $\Delta\phi_{RAR}$. The angular region in which the doppler beam sharpening resolution $\Delta_{\phi DBS}$ is poorer than the real aperture radar resolution $\Delta\phi_{RAR}$ is known as the "blind sector".

When the SAR is observing straight outward, directly in flying direction, objects that lie within the half-value width $2\alpha_{3dB}$ of the antenna are no longer clearly located, since objects lying both right and left of the flying direction have identical doppler frequency shifts. This leads to an "azimuth ambiguity" (J. C. Curlander, R. N. McDonough, Synthetic Aperture Radar, John Wiley & Sons, Inc., New York, 1991).

Conventional radar systems must therefore find a compromise between good real aperture resolution to minimize the "azimuth ambiguity" and a small "blind sector". For this purpose it must be ensured that the angular region of "azimuth ambiguity" does not overlap with the angular region within which resolution must be achieved on the basis of doppler frequencies. In practice, this means that the radar system must be designed such that the angular region of "azimuth ambiguity" is not greater than the "blind sector". Furthermore, conventional radar systems must have a logic system that informs the signal-evaluating system of the angular direction at which resolution with real aperture resolution can become better than with doppler beam sharpening in azimuth direction and vice versa.

SUMMARY OF THE INVENTION

The object of the invention is to find a method as well as a suitable device for performing the method which reduces both the "blind sector" and the region of "azimuth ambiguity". Another object of the invention is to circumvent the need for a logic system that informs the signal-evaluating system of the azimuth viewing direction φ at which resolution with real aperture resolution becomes better than with doppler beam sharpening in azimuth direction.

In the inventive method for increasing the angular resolution in a radar system which evaluates the doppler frequency shift of the transmitted signal in order to increase the angular resolution, a plurality of adjacent, narrow regions are sampled sequentially by means of a pencil-beam antenna characteristic during movement of the radar system. Such sampling takes place so rapidly that it is equivalent to illumination of the total area of all regions by means of an antenna with broad-beam antenna characteristic. Thus the antenna characteristic of this simulated, broad-beam illumination corresponds to superposition of the individual antenna characteristics which sample narrowly bounded regions. The method evaluates both the signals resulting from the pencil-beam sampling process and the simulated broad-beam antenna signal resulting by means of superposition of the individual sequential, pencil-beam sampling processes. On the basis of the instantaneous viewing angle of the radar system, a decision is advantageously made as to whether the signals resulting from the pencil-beam sampling process will be evaluated individually, or whether the simulated broadband antenna signal will be used. The large angular region, which is illuminated almost simultaneously, leads to an illumination time that is adequate for calculation of the doppler frequency shift. At the same time, good real aperture resolution can also be achieved on the basis of the evaluation of the pencil-beam antenna characteristics.

BRIEF DESCRIPTION OF THE DRAWING

FIG. 2 is a graph showing azimuth angles for three pencil-beam sampling characteristics.

FIG. 3 is a graph showing azimuth resolution for azimuth viewing direction according to the invention.

Figure 1:
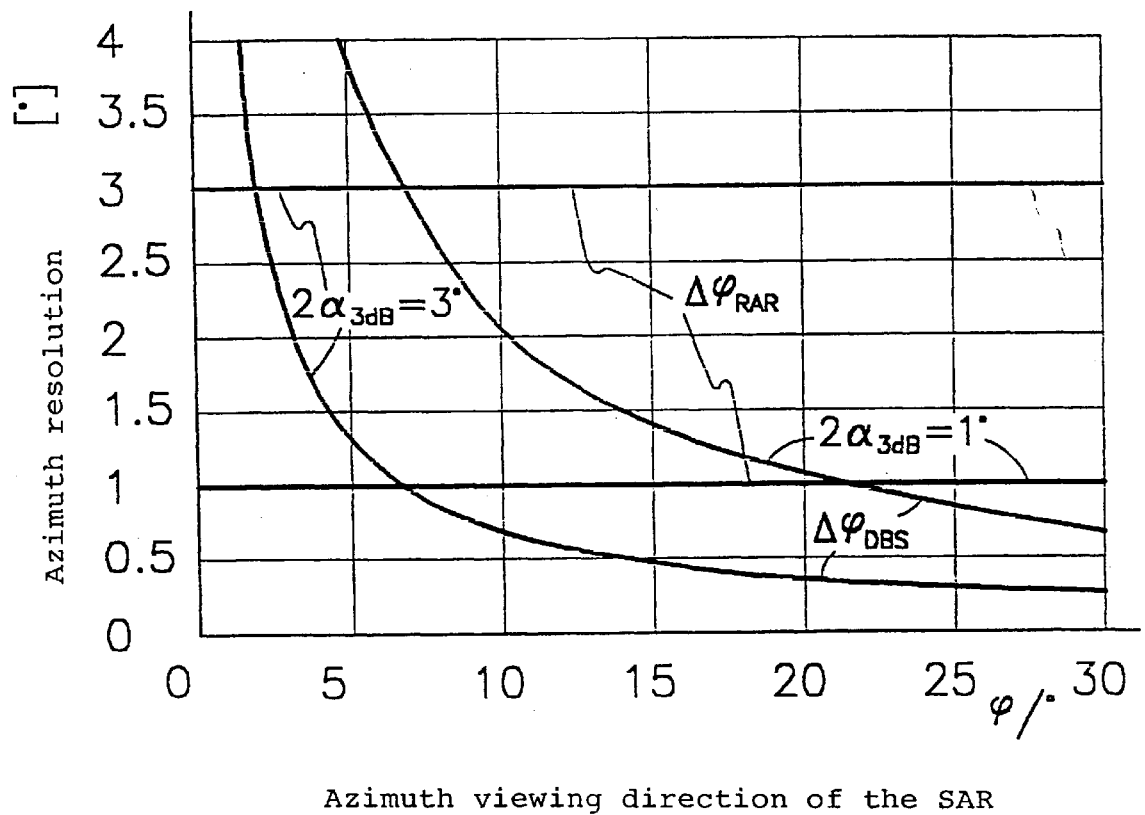
FIG. 1 is a graph showing azimuth resolution for azimuth viewing direction.
Figure 4:
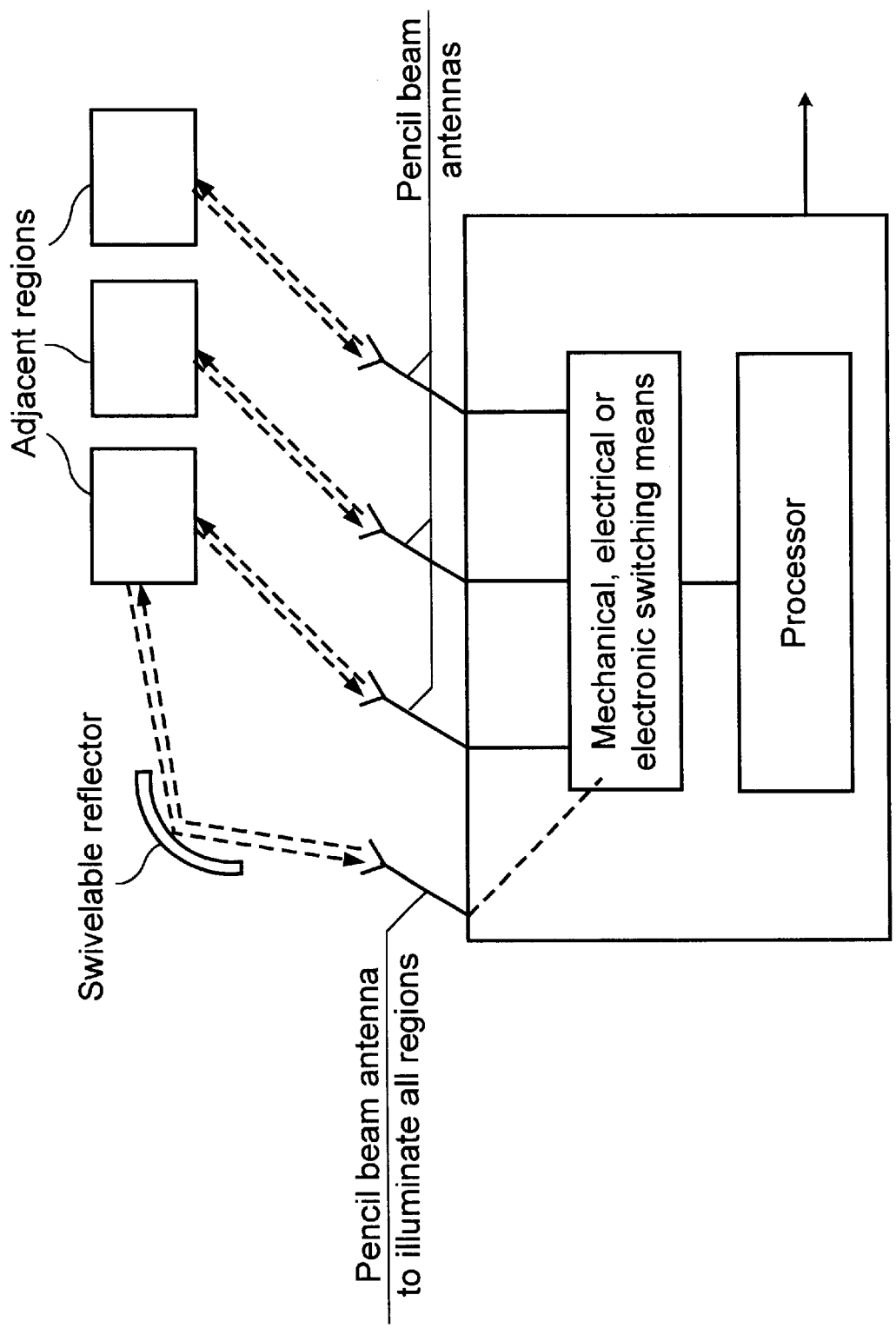
FIG. 4 is a diagrammatic illustration of a radar system according to the invention.

The inventive device for performing the method of increasing the angular resolution in a radar system uses one or more antennas with pencil-beam antenna characteristic for sampling of the adjacent narrowly bounded regions. The device advantageously comprises at least two antennas with pencil-beam antenna characteristic disposed parallel to one another, between which switching takes place sequentially. Such switching can be accomplished mechanically, electrically or electronically. In another conceivable embodiment, there is used only one individual antenna, which is aligned toward a swivelable reflector, whose stepwise rotation makes it possible sequentially to illuminate adjacent regions. In general, it is possible for the transmitting and receiving antenna systems to have identical construction or for the same system to be used for transmission and reception. On the other hand, it is also conceivable for the transmitting and receiving antenna systems to be constructed differently, for example with one broad-beam receiving antenna and a plurality of pencil-beam transmitting antennas.

DETAILED DESCRIPTION

In FIG. 2 there are illustrated as examples three pencil-beam resulting antenna characteristics 1 to 3, each of which has a half-value width $2\alpha_{3dB}$ equal to 1° and whose summation characteristic has a half-value width $2\alpha_{3dB}$ equal to 3°. In FIG. 3 there is illustrated, function of azimuth viewing direction $\phi$, the resolution $\Delta\phi_{new}$ 12 resulting from equations (1) and (4) corresponding to the values $f_c$=10 GHZ, v=100 m/s, $\omega$=40°/s and $2\alpha_{3dB}$=1° used as examples. This curve 12 for $\Delta\phi_{new}$ corresponds to a combination of partial regions of curve 10 (resolution with the expanded antenna characteristic on the basis of doppler frequencies) and of curve 11 (resolution with the expanded antenna characteristic on the basis of the fine structure of the antenna characteristic).

If the radar system uses a filter adapted to the resulting antenna characteristic and thq doppler frequencies to be evaluated, or if it uses another linear estimation method (for example: the linear, unbiased optimal estimation method or the Wiener estimation method), there is no need for a logic system that informs the signal-evaluating system of the azimuth viewing direction $\phi$ at which resolution with real aperture resolution becomes better than with doppler beam sharpening in azimuth direction.

Advantageous embodiments of the antenna array are obtained by disposing in parallel pencil-beam antennas which are sequentially selected by the transmission electronics. If three pencil-beam antennas are used for this purpose, there is obtained from the three individual antenna diagrams 1 to 3 the antenna diagram, as shown in FIG. 2, resulting from superposition of the individual diagrams. Even if only one individual pencil-beam antenna element is used, however, a comparable antenna diagram can be attained by deflecting its illumination diagram by a swivelable mirror.

What is claimed is:

1. A method for increasing angular resolution in a radar system looking in a direction of motion of the radar system and laterally thereto
    wherein a doppler frequency shift of a transmitted signal is used to increase the angular resolution
    characterized in that
        during movement of the radar system, the radar system sequentially samples a plurality of adjacent, narrow regions by means of pencil-beam antenna signals,
        said adjacent, narrow regions are sampled so rapidly that this stimulates and is equivalent to illumination of a total area of all regions by means of a broad beam signal from the antenna,
        said broad-beam signal corresponds to superposition of individual, pencil-beam antenna signals from the narrow regions, and
        evaluating the pencil-beam signals and the equivalent broad-beam signal to obtain increased angular resolution of the radar system.

2. A method according to claim 1, characterized in that, during signal evaluation on the basis of instantaneous viewing angle of the radar system, a decision is made as to whether the signals resulting from the pencil-beam sampling will be evaluated individually, or whether the simulated broad band antenna signal will be used.

3. An antenna array for use in the radar system for performing the method according to claim 1,
    characterized in that
        one or more antennas with pencil-beam antenna characteristic are used for sampling of the adjacent regions.

4. An antenna array according to claim 3, characterized in that the array comprises at least two antennas for pencil-beam signals disposed parallel to one another, and wherein switching of said signals takes place sequentially.

5. An antenna array according to claim 3, characterized in that said switching takes place mechanically.

6. An antenna array according to claim 3, characterized in that said switching takes place electrically.

7. An antenna array according to claim 3, characterized in that said switching takes place electronically.

8. An antenna array according to claim 3, characterized in that one individual pencil-beam antenna is aligned with a mechanically swivelable reflector which is stepwise rotatable to sequentially to illuminate said closely adjacent regions.

9. An antenna array according to claim 3, characterized in that a transmitting antenna system and a receiving antenna system are the same.

10. An antenna array according to claim 3, characterized in that a transmitting antenna system and a receiving antenna system are constructed of a different design.

* * * * *